United States Patent [19]
Pauliukonis

[11] Patent Number: 4,834,347
[45] Date of Patent: May 30, 1989

[54] POSITIONER WITH LARGE DIAMETER PISTON ROD AND FLUTED VOLUME-COMPENSATING PISTON

[75] Inventor: Richard S. Pauliukonis, Cleveland, Ohio

[73] Assignee: Grazina J. Pauliukonis, Cleveland, Ohio

[21] Appl. No.: 183,888

[22] Filed: Apr. 20, 1988

[51] Int. Cl.$^4$ ............................ F16F 9/36; F16F 9/32
[52] U.S. Cl. .................................. 267/64.12; 188/300; 188/322.22
[58] Field of Search ............... 188/299, 300, 313, 316, 188/317, 319; 222/386; 92/170, 174, 181 P, DIG. 1; 267/64.12

[56] References Cited

U.S. PATENT DOCUMENTS

| | | | |
|---|---|---|---|
| 3,223,206 | 12/1965 | Bainbridge et al. | 188/317 X |
| 3,343,833 | 9/1967 | Fader | 188/313 X |
| 3,762,514 | 10/1973 | Freitag | 188/300 |
| 3,828,651 | 8/1974 | Dorner et al. | 188/300 X |
| 4,113,220 | 9/1978 | Godwin et al. | 188/300 X |
| 4,257,582 | 3/1981 | Wirges | 188/300 X |
| 4,667,780 | 5/1987 | Pauliukonis | 188/300 |

FOREIGN PATENT DOCUMENTS

| | | | |
|---|---|---|---|
| 3437098 | 4/1986 | Fed. Rep. of Germany | 188/300 |
| 2586771 | 3/1987 | France | 267/64.12 |

Primary Examiner—Robert E. Garrett
Assistant Examiner—George Kapsalas
Attorney, Agent, or Firm—Marius J. Jason

[57] ABSTRACT

A fluted piston for a volume-compensated pressurized adjustable length positioner. The cylinder is charged through the charging/discharging valve so that the opposed fluid chambers defined inside the cylinder bore by the slidably movable piston are filled with compressible fluid at elevated pressure. An actuating rod in the piston operates a valve in the piston to open communication between the opposed chambers and allow selective extension and retraction of the piston rod. The large-diameter piston rod has an elongated head configuration formed by flute ribs. These ribs provide bearing support for the extended piston rod and create a volume compensating space in the piston head to account for the large ratio of extended-rod cylinder volume to retracted rod cylinder volume.

6 Claims, 1 Drawing Sheet

POSITIONER WITH LARGE DIAMETER PISTON ROD AND FLUTED VOLUME-COMPENSATING PISTON

BACKGROUND OF THE INVENTION

1. Field of the Invention

This invention relates to piston and cylinder type power cylinders in general and to fluted piston and rod assembly in particular, for permitting safe operation of the cylinder subjected to both internal pressure hoop stress and to external side loading in service, in particular when injection molded economically from engineering plastics for use with gas cylinders.

2. Description of the Prior Art

At the present time the conversion of all metal power cylinders, in particular high pressure gas cylinders used for assisting the movement of structural members of scientific equipment, including table tops, chair seats, operating tables or other members, to low pressure devices for safer operation using newly introduced materials such as engineering plastics which by nature are not as strong as metals but more attractive economically requires drastic design changes to sustain physical and operational abuse with equal success.

As a general rule in power cylinders, the size of a piston rod is only a fraction of the piston to which it is normally secured by welding or threaded connection when produced from metal. In order to closely balance directional end forces of a double acting power cylinder, the pressure of the working fluid over the piston sides must be varied accordingly in proportion to the areas provided. As a result, cylinders with heavier piston rods require pressure increase to the piston underside for return from rod extended to rod retracted position with equal force. For applications which do not employ pressure force for rod retraction, in particular in structures such as support columns used widely as single legs in chairs wherein the seat may be mounted upright to the piston rod while the cylinder is fixed to the base, the weight of a person may act as an external force for rod retraction from the extended position. An increase in piston rod diameter may be exploited here to the advantage using lower operating pressures. This is so because the end force to the piston face inside tubular housing with rod protruding a portion subjected to atmospheric or ambient conditions is equal to the area of the rod times internal pressure. In turn, devices such as gas cylinders which operate on a charge of pressurized working fluid circulating internally between piston sides via fluid passages incorporated therein and controlled externally during unit operation can be produced from material other than metal. For example, metal piston rod of ¼ inch diameter and 0.5 inch squared cross section adaptable for carrying 100 lbs axial load would require pressure of 2000 psig inside cylinder. For the same end load of 100 lbs a piston rod of 1⅛" diameter having 1 inch$^2$ cross section requires only 100 psig pressure resulting in lower stresses and safer operation. The advantages offered by the tradeoff in rod diameter allow consideration of more economical materials such as plastics even if it is not as strong as the metal found in conventional cylinders.

The designs incorporating fluted piston into the cylinder can revolutionize conventional concepts. No doubt the economics would be prohibitive to construct a metal piston with flutes. In particular that using metal piston rod of small diameter which can carry an ample end load when attached to a piston of generally much larger diameter, piston sides provide practically equal fluid chambers when piston position inside the cylinder changes from a rod extended, creating a first fluid chamber in cylinder end facing piston head, to a rod retracted position, creating a second fluid chamber in the opposite cylinder end facing piston underside. This is not so when the rod diameter is greatly increased to carry the same load while using plastics. The second cylinder end facing piston underside, while housing larger piston rod, would result in the second fluid chamber of considerably smaller and practically unacceptable volume from operational standpoint. This is so because the cylinder, pre-charged with an initial pressure of say 100 psig is forced to circulate fluid from the first chamber which is larger to a second chamber which is smaller. As a result, when a larger external force is applied to the piston rod end for piston position change, the internal gas pressure inside second fluid chamber increases in proportion to ratio of volumes chambers provide. The cylinder will not operate properly unless piston is elongated and provided with flutes for volume compensation. Elongated piston with flutes, cut slightly below piston rod diameter, serves not only as volume compensator between fluid chambers, but also doubles as an elongated bearing surface in contact with cylinder bore to handle side loads of the unit in a specific application, in particular in chairs subject to height adjustment.

In turn, cylinders with fluted novel piston produced by injection molding from plastics yield economy not attainable by fabricated metal cylinders, advancing the state of the art of such devices beyond anticipation.

SUMMARY OF THE INVENTION

It is accordingly an object of the present invention to provide an allplastic self-contained pressurized device for height adjustment which is simple in construction and economical in production.

According to an especially advantageous embodiment of the invention, the fluted piston with integrally molded piston rod serves simultaneously as a structural member to carry side loads in service and as a volume compensator in operation.

It is a specific object of this invention to permit a construction of a gas cylinder for use as a column of adjustable length with operating member incorporated therein adaptable of low pressure operation, in competition with high pressure metal cylinders of the prior art, thereby improving safety of such devices.

A further object of the present invention is to provide a fluted piston with ribs extending longitudinally along the axis of the piston head provided with a peripheral seal groove incorporated therein, and integrated into a piston rod of slightly smaller diameter than the diameter of said piston head.

The object and other features of the present invention will be apparent from a reading of the ensuing part of the specification of the invention in conjunction with the accompanying drawings which indicate a preferred embodiment of the invention.

Figure 1:
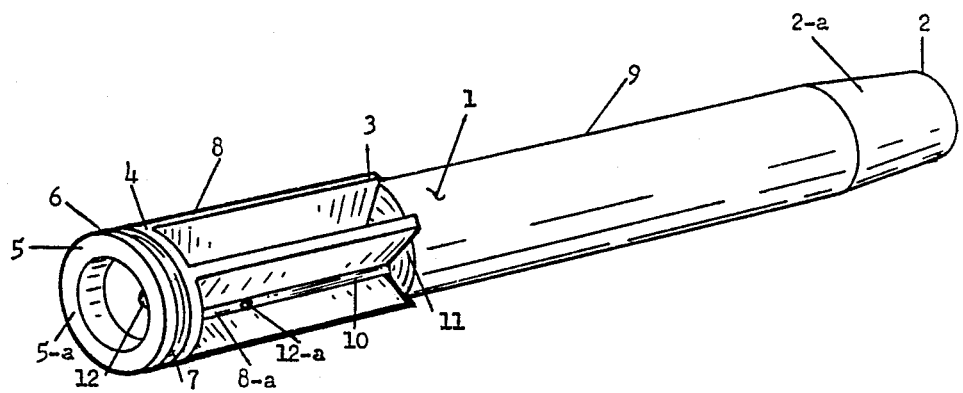
FIG. 1 is a perspective view of the fluted piston and rod assembly embodying the present invention.

DESCRIPTION OF PREFERRED EMBODIMENT:

FIG. 1 shows a fluted piston and rod assembly 1 of an all-plastic onepiece construction of which a first rod end 2 of an elongated rod 9 extending therefrom integrates into ribs 3 of a piston 4 along the length thereof and terminates with a second piston end 5 provided with a narrow piston head 6 with a seal groove 7. Head 6 terminates with a fluted piston portion 8 continuing inwardly towards the first rod end 2 to integrate with the elongated rod 9 of a slightly smaller diameter than the diameter of piston 4 by way of grooves 10 at an intersection 11 therebetween. Rod end 2 may be tapered a portion 2-a for coupling to a receiver (not shown) of a structure such as a seat supporting member with an inner cavity also tapered. A fluid communication means between piston sides separated by a seal in groove 7 when piston and rod assembly 1 is slidably received inside a cylindrical body (shown in FIG. 2) may include a first port 12-a entering bottom of a groove 8-a of flute 8 perpendicularly to meet an axial second fluid port 12 entering piston face 5-a centrally to continue internally so as to be adaptable of control by appropriate valve control means incorporated therein (not shown) facilitating cylinder actuating means to be described by reference to FIG. 2. The fluted portion 8 may have a plurality of ribs 3 determined by the application in final analysis of the unit dimensionally, of the length of such unit in proportion to piston and rod diametral ratios, stroke of the unit, applicational end forces etc. subject to determination with consideration of the working fluid which may be a gas such as compressed air, nitrogen, carbon dioxide or the like used with oils and lubricants if necessary, including operational pressures, materials of construction etc. Further, it should be stated that the fluted piston and rod assembly of FIG. 1 can be assembled into other than FIG. 2 tubular housing with equal success. It can be used in cylinders designed for applications which require valve controls to be mounted into the blind end of the cylinder, opposite to cylinder rod end, such as found in prior art references issued to Bauer, U.S. Pat. Nos. 3656593, 3711054 and 3825244, and Nagase et al 4108416. These designs are of double walled tubular construction with cylinders proportionally larger than the protruding piston rods, requiring stand tubes for piston rod support when extended (see part 25 of U.S. Pat. No. 4108416 by Nagase et al and part 7 of U.S. Pat No. 3711054 by Bauer both showing the stand tubes of chair basis as supporting devices which per FIG. 2 of the present invention are eliminated due to the piston rod size increase). It follows that the fluted piston and rod assembly of the present invention when used inside a single tubular housing of FIG. 2 is preferred, although not limited thereto, from simplicity in manufacture by molding and from operational standpoints.

Figure 2:
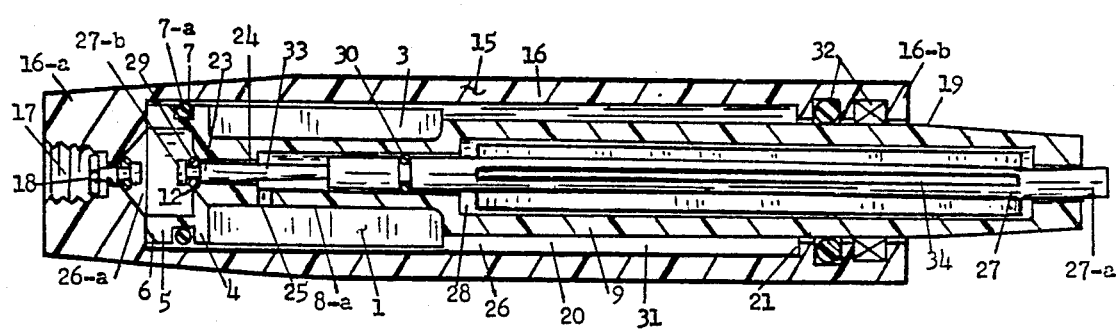
FIG. 2 is a side-elevational sectional view of the piston and rod assembly mounted inside a cylindrical elongated housing embodying a gas cylinder of the present invention.

FIG. 2 shows the piston and rod assembly of FIG. 1 mounted inside an elongated tubular housing embodying a gas cylinder 15 of the present invention in cross-section. FIG. 2 gas cylinder represents an all-plastic simplified unit construction with fluted piston and rod assembly 1 of FIG. 1 incorporated into an elongated cylindrical housing 16 for operation with a charge of pressurized working fluid supplied thereto via a fluid supply port 17 provided with an integral check valve 18 incorporated therein into a first cylinder end 16-a which is blind, opposite a second open cylinder end 16-b which is sealably closed by a protruding rod end 19. The piston and rod assembly 1 is slidable inside a cylinder bore 20 forming fluid chambers between the ends thereof from a first piston rod retracted position of FIG. 2 defining a first fluid chamber 26 to a second piston rod extended position (not shown) with ribs 3 of piston 4 abutting a bore shoulder 21 at the end of piston stroke defining a second fluid chamber 26-a facing cylinder blind end 16-a. In turn, an infinite number of positions is selectable by a stop-over between piston stroke in either direction. Normally, the piston and rod assembly 1 inside bore 20 is fixed in a position selected by constantly prevailing pressure of the working fluid over the piston sides from both fluid chambers. In order to change fixed position thereof, the fluid chambers must be set into fluid communication therebetween. Such fluid communication may proceed from a second chamber 26-a via an orifice 24 of a valve means 23 incorporated into the center of piston end 5 to exhaust via a perpendicular hole 25 in the wall of the bottom of flute 8 into a first chamber 26. Or it may recirculate from the first to the second chambers in reverse when valve 23 becomes opened by actuating externally a valve control means incorporated therein. An elongated actuating rod 27 of a slightly longer dimension than the inside bore 28 of piston and rod assembly 1 is spaced inside thereof centrally so as to have a first end 27-a slightly protrude the end 19 of the piston rod 9 for actuation of valve means 23 at the opposite piston end 5 in service. A second opposite end 27-b of actuating rod 27 terminates with a valve seal 29 inside a groove thereof for control of fluid flow between fluid chambers separated by a piston seal 7-a in groove 7 of piston head 6 shown in FIG. 1. In FIG. 2 an additional seal 30 spaced a distance away from perpendicular hole 25 towards the first rod end 27-a inside appropriate seal groove of actuating rod 27 insures that there is no leak from bore 28 at any time. Seal 30 also provides automatic valve closing due to pressure action over it inside bore 28 forcing the actuating rod 27 to always assume valve closed position with valve seal 29 tightly seated inside fluid port 12 of piston end 5 because the size of the seal 30 is purposely selected to be larger that the size of seal 29 of valve means 23. The pressure end force inside bore 28 over seal 30 being larger than the pressure end force over seal 29 maintains valve means 23 bubble tight shut until rod end 27-a of actuating rod 27 is externally depressed by a larger force to render valve means 23 open and unit operational with piston position change inside cylinder bore 20. Changing piston position inside bore 20 of FIG. 2 is associated with elimination or reduction of volumes in either first or second fluid chambers, depending on the position the piston and rod assembly 1 is to assume in an application, controlled by the operator adding or removing external weights to a structure subject to height adjustment. As FIG. 2 shows, with piston rod in the first retracted position there is practically no fluid chamber 26-a visible and the working fluid is forced into the first fluid chamber 26. If not for fluted piston portion 8, an annulus 31 between piston rod 9 and bore 20 would be very small to house working fluid forced from fluid chamber 26-a into chamber 26. This is so because chamber 26-a with piston rod in the second extended position is equal to area of bore 20 times the stroke. For example, if piston rod 9 is selected to be 1 ⅛ inch diameter to sustain service requirements in a height adjustable chair with approximately 100 lbs. upwardly acting force, and a stroke of 4.5 linear inches inside the cylinder bore 20 of 1⅜" inside diameter, following volume ratios inside fluid chambers will prevail: second chamber 26-a of 1⅜" I.D. has a cross-sectional area 1.49 in² with fluid volume of 1.49 times 4.5 strokes=6.7 inch cube, while the first chamber 26 without the fluted piston portion 8 would only be 1.49 in² (bore area)−0.994 in² (rod area)=0.496 in² times 4.5 stroke=2.23 inch cube. The volume ratios of such combinations is 6.7/2.23=3. Roughly speaking, if the initial working fluid pressure for the above application to satisfy 100 lbs force is approximately 100 psig charging pressure, the operational unit pressure is close to 3 times larger inside annulus 31 of bore 20. In turn, to overcome 100 lbs upwards acting force, downward external force to the piston rod of 300 lbs must be used for retracting rod to the first position, objectionable from both standpoints, the operational and the physical, unless fluted piston is used to reduce operational pressure to a ratio of 1½ thereby also reducing cylinder loading stress physically, hardly attainable by prior art means without the use of fluted design of the present invention. In fact, using 4 ribs 3 inch long and ¼" thick for fluted piston portion 8 of piston 4 being 1⅜ outside diameter with a clearance to enter cylinder bore 20 of 1⅜ inside diameter slidably, the volume ratio of fluid chambers will reduce to less than 1.5 as can be shown next. Assuming that the flute bottom or groove 8-a diameter shown in FIG. 1 is 9/16 inches, the area of a circular ring sector is approximated as $A=0.00218 \& (D^2-d^2)$ where $\&$=angle in degrees which in our case $\&=70°$ and $A=0.00218\times70(1⅜^2-0.5625^2)=0.2455$ in² for single flute times 4 flutes, $A=0.982$ in² for fluted section 8 of piston 4, while volume of 3" long ribs is $V=0.982\times3=2.94$ inch cube. Adding volumes together, the fluid chamber 26 becomes $V_t=2.94+2.23$(annulus 31)=5.17in³ with new ratio fluid chambers being 6.7/5.17=1.3 instead of original ratio=3.

Further advantages the fluted piston head 6 of FIG. 1 when used with gas cylinder of FIG. 2 provides is in the contact bearing requirements, vital to piston rod support when fully extended, It is known that when the piston and rod assembly 1 is in the second piston rod extended position, the most common failure occurs at the second open cylinder end 16-b provided with rod seals 32 at the end of bore shoulder 21 if the piston is narrow because of the side loading in service. Metal pistons are typically narrow, as can be seen from the prior art reference cited. For improved stability, additional bearing support is mandatory. Specifically for this purpose the U.S. Pat. Nos. to Bauer, 3711054 and to Nagase 4108416, showing stand tubes also called quide tubes or supporting devices, identified by 7 and 25 respectively incorporate rather long bushings 22 and 27 in contact with extensions 1 and 12 of equivalent diameter to the present piston rod 9 which dispenses with extra stand tubes that use long bushings by the use of fluted piston with elongated ribs that serve more economically and provide needed bearing support for stability in identical applications.

In operation, upon slight depression of actuating rod end 27-a the piston and rod assembly 1 is set into motion to either extend piston rod 9 from FIG. 2 position due to the fluid force over the piston rod area exerted by the working fluid pressure or to retract when operator applies external force such as body weight or the like of larger magnitude than the internal fluid force exerted in the opposite direction. Should valve control means of valve means 23 include a tapered portion 33 incorporated into the actuating rod 27 for metering flow when axially moving inside orifice 24, further depression of actuating rod end 27-a would increase the speed of motion of piston and rod assembly 1 inside cylinder bore 20, but it is not limited thereto since the unit operation may proceed well without the use of such tapered controls. In fact, it will suffice to lift the valve seal 29 from the seat of the mouth of the port 12 to facilitate fluid communication between fluid chambers with associated piston position change into direction desired. Releasing the actuating rod end 27-a automatically stops the motion rendering piston position fixed within the stroke limitations incorporated therein due to fluid trapped in each respective fluid changer.

Although FIG. 2 identifies piston rod bore 28 of variable diameter, inside of of which the actuating rod 27 is shown with a section 34 containing extended ribs, in practice rod 27 may be modified to other configuration adaptable for use as valve operating means for control of fluid communication between fluid chambers with equal success instead.

The design of fluted piston inside gas cylinder shown and described in FIG. 1 and FIG. 2 provides novel means of producing economical lifting devices from plastics for commercial and industrial applications including toys requiring light weight and corrosion resistant characteristics not found in prior art devices.

It will be obvious to those skilled in the art that various changes may be made in the above designs without departing from the scope and the spirit of the invention, and the invention is not to be considered limited to what is shown in the drawings and described in the specification.

I claim:

1. A fluted piston in cylinder comprising:
   an all plastic one-piece elongated piston and rod assembly of which a first end is provided with a fluted piston section at the end of a narrow piston head with a peripheral seal incorporated therein while a second end of slightly smaller diameter starts with a tapered piston rod end to continue inwardly by a straight elongated piston rod for integrating into said fluted piston section provided with ribs comprising together a structure of said piston and rod assembly which is slidably received inside an elongated tubular housing and movable therein between a first piston rod extended position and a second piston rod retracted position when charged with pressurized working fluid entering a first cylinder blind end opposite a second cylinder open end closed by said piston rod sealably so as to form fluid chambers at opposite piston sides including fluid communication means therebetween when said piston and rod assembly is moved axially inside said tubular housing,
   said fluid communication means including a valve and a valve control means incorporated therein adaptable for control of fluid flow between chambers with associated piston position changes from said first piston rod extended, induced by internal fluid force while returning to said second position by externally applied force,
   means of balancing fluid volumetric space in said fluid chambers including space between said piston ribs serving as volume compensator for one of said fluid chambers, and when said piston rod is in said first extended position, said fluted piston section provides rigidity to said piston rod subject to side loading in service, and when said piston rod is in said second piston rod retracted position, said space between said ribs of said fluted piston section is said volume compensator for balancing said volumetric space between said fluid chambers.

2. A fluted piston in cylinder as in claim 1 wherein said first cylinder blind end includes an integrally mounted plastic check valve means for charging cylinder with working fluid under pressure initially so as to render cylinder operative without external source of additional power supply for as long as the cylinder is in service.

3. A fluted piston comprising:
an all-plastic one-piece piston and rod assembly of which a first rod end extending inwardly a substantial distance therefrom terminates with radial ribs grooved below a diameter of said rod while a second piston end thereof includes a narrow piston head, extension of which continues inwardly a substantial distance therefrom forming fluted piston portion provided with said radial ribs, said piston and rod assembly adaptable for use inside an elongated cylindrical housing and forming together a gas cylinder pre-charged with an initial volume of pressurized working fluid for cylinder operation while recirculating in a closed loop between fluid chambers formed at opposite piston sides separated by a piston seal so as to allow controlled piston position change from a first piston rod retracted position to a second piston rod extended position from one of the cylinder ends of said elongated cylindrical housing, a fluid communication means between said fluid chambers including valving means incorporated therein, means for operating said valving means from a first valve closed position which controls piston rod protrusion from said housing in a position fixed by said working fluid in said fluid chambers exerting opposite fluid force over piston head to a second valve open position for piston position change therein when fluid communication between said fluid chambers becomes established, and means for an infinite number of piston and rod position changes between said first piston rod retracted and said second piston rod extended positions defining a cylinder axial stroke, said flutes in said piston of said piston and rod assembly serving as both a volume compensator between said fluid chambers vital to proper cylinder operation when piston rod is of nearly the same diameter as that of the piston dictated by lower strength of the plastics versus strength of conventional smaller diameter metal rods and for rigidity as a bearing support for piston rod extended and subjected to side loading in service, and when said valve is in said second open position, said internal fluid end force urges said piston rod to extend unless opposed by a larger external opposite force of larger magnitude to urge said piston rod to retract;

4. A fluted plastic piston comprising:
an elongated piston and rod assembly of which a first rod end extends a substantial distance inwardly towards a second end thereof to integrate into a set of outwardly extending radial ribs of a fluted piston spaced opposite thereto, while a second opposite piston end of slightly larger diameter than said rod, starting with a narrow piston head provided with a peripheral seal groove incorporated therein extends inwardly towards said first rod end as a long fluted piston portion of which said radial ribs continue a considerable distance before integrating into said first rod end, said fluted piston portion serves as a volume space for housing working fluid therein and said ribs serve as a long bearing surface for side loading when said piston and rod assembly becomes incorporated into an elongated cylindrical housing to comprise an all plastic gas cylinder that operates with a charge of pressurized working fluid circulating between piston sides of said fluted piston in a controlled closed loop circuit so as to permit axial motion of said piston and rod assembly inside said housing from a first piston rod retracted to a second piston rod extended position.

5. A fluted plastic piston as in claim 4 wherein said gas cylinder is placed into a structure such as a chair subject to seat height adjustment so as to have both a first housing end and an opposite said rod end firmly secured between a chair base and a seat as a structural column adaptable for seat position change, a fluid communication means in said fluted piston including a valving and a valve control means incorporated therein.

and said valve control means having an actuated, state in which the working fluid trapped inside said cylinder starts flowing via said fluid communication means between a first fluid chamber created therein facing said piston head and a second fluid chamber created by said volume space of said fluted piston portion resulting in said position change until stopped in a de-actuated state of said valve control means resulting in a stationary position fixed by opposing fluid pressure over said piston until moved to another position selected from an infinite number of possible positions between said first piston rod retracted position while only a small rod end secured to said structure protrudes said cylindrical housing, and a second piston rod fully extended position defining a stroke of said gas cylinder when said valve control means is in said actuated state.

6. A fluted piston cylinder comprising:
an elongated piston and rod assembly with a piston and seal at a first end thereof while the opposite second end terminates with a rod end of an integral piston rod leading a substantial distance inwardly to blend into a set of flutes of piston diameter resulting in said fluted piston of shorter length than the length of said piston rod, including a control means for cylinder operation incorporated therein, an elongated cylinder housing with a bore passing therethrough between the ends thereof, said bore adaptable for receiving slidably said piston and rod assembly between the ends thereof so as to have said rod end protrude from a first bore end provided with seals while a second bore end is closed by an end plug provided with a fluid port to permanently energize said cylinder with working fluid under pressure so as to permit piston and rod position change from piston rod retracted to piston rod extended positions when said cylinder operating control means are activated.

* * * * *